United States Patent
Matsui et al.

(10) Patent No.: US 7,597,957 B2
(45) Date of Patent: Oct. 6, 2009

(54) MODIFIED POLYVINYLIDENEFLUORIDE RESIN MONOFILAMENT AND METHOD FOR MANUFACTURING THEREOF

(75) Inventors: Hirokazu Matsui, Omitama (JP); Hiroshi Ochiai, Omitama (JP); Masaru Satou, Omitama (JP); Satoshi Hashimoto, Omitama (JP); Toshiya Mizuno, Omitama (JP)

(73) Assignee: Kureha Corporation, Tokyo (JP)

( * ) Notice: Subject to any disclaimer, the term of this patent is extended or adjusted under 35 U.S.C. 154(b) by 475 days.

(21) Appl. No.: 11/407,287

(22) Filed: Apr. 20, 2006

(65) Prior Publication Data

US 2006/0257654 A1 Nov. 16, 2006

(51) Int. Cl.
*D02G 3/00* (2006.01)

(52) U.S. Cl. .................. 428/364; 428/394; 428/373; 525/199

(58) Field of Classification Search ............... 428/364, 428/373, 394; 525/199
See application file for complete search history.

(56) References Cited

U.S. PATENT DOCUMENTS

| | | | | |
|---|---|---|---|---|
| 4,546,158 A | * | 10/1985 | Mizuno et al. | 526/255 |
| 4,592,949 A | * | 6/1986 | Mizuno et al. | 442/189 |
| 4,667,001 A | * | 5/1987 | Mizuno | 526/255 |
| 5,198,502 A | * | 3/1993 | Tatemoto | 525/276 |
| 5,658,663 A | * | 8/1997 | Mizuno et al. | 428/364 |
| 5,845,430 A | * | 12/1998 | Nakano et al. | 43/44.98 |
| 6,170,192 B1 | * | 1/2001 | Nakano et al. | 43/44.98 |
| 6,512,032 B1 | * | 1/2003 | Ohira et al. | 524/128 |
| 6,843,948 B2 | * | 1/2005 | Ohira et al. | 264/172.17 |
| 7,135,529 B2 | * | 11/2006 | Sullivan | 525/294 |
| 7,351,338 B2 | * | 4/2008 | Tada et al. | 210/500.23 |
| 2005/0096735 A1 | * | 5/2005 | Hojeibane et al. | 623/1.24 |
| 2006/0257654 A1 | * | 11/2006 | Matsui et al. | 428/364 |
| 2007/0055020 A1 | * | 3/2007 | Park | 525/199 |

* cited by examiner

*Primary Examiner*—N. Edwards
(74) *Attorney, Agent, or Firm*—Reed Smith LLP

(57) ABSTRACT

[Object] In a fishing line for capturing large fishes made by a polyvinylidenefluoride resin filament, a polyvinylidenefluoride resin filament wherein even by enhancing the tensile strength at break by enlarging the filament diameter than that of usual fishing line, an appropriate tensile elongation at break can be obtained, so that the rapid and enormous impact generated when large fishes have taken the bait can be reduced, and that has a homogenous fiber structure which generates almost no inner cavity when forming a filament with a large diameter, is developed.

6 Claims, No Drawings

MODIFIED POLYVINYLIDENEFLUORIDE RESIN MONOFILAMENT AND METHOD FOR MANUFACTURING THEREOF

TECHNICAL FIELD

The present invention relates to a polyvinylidenefluoride resin monofilament and a method for manufacturing thereof, in particular to a reformed polyvinylidenefluoride resin monofilament with a strong tensile strength at break and an appropriate tensile elongation at break, with almost no cavity generated inside, which is preferably used for fishing lines for capturing large fishes, and a method thereof.

BACKGROUND ART

Polyvinylidenefluoride resin filaments are excellent from the point of view of tensile strength, impact resistance, weather resistance, and water resistance. They are used for various purposes, but mainly for fisheries supplies.

Conventionally, as filaments (fiber) used for fisheries supplies including fishing lines and fishing nets, synthetic resin materials were generally used for their economic efficiency, formability, excellent strength, or transparency.

Among them, polyamide resin (nylon) was mainly used in previous times. However, while their tensile strength or knot strength were excellent, these strengths decrease in water, and as their submergence (sedimentation property in water) is low and they turn yellow with time, polyolefin resin including polypropylene resin or polyvinylidenefluoride resin are now widely used instead of polyamide resin.

In particular, polyvinylidenefluoride resin filaments are excellent from the view of strength, impact resistance, and weather resistance or water resistance, and they have good submergence due to their high-density. Further, as their refractive index is similar to that of water and their surface reflection is low and transparency is high in water, they are highly appreciated as fisheries supplies.

Polyvinylidenefluoride resin filaments which are highly appreciated for fishing lines are highly demanded, further amelioration of performance or improvement of properties were consistently awaited. Thus, researches for ameliorating tensile strength, tensile elongation, and flexibility or knot strength, or what is called twist (or curl) of line (twisting (or curling) tendency) were made from previous times. As methods for ameliorating these problems, various propositions for improvement have been made and disclosed in patent publications and the like, wherein making polyvinylidenefluoride resin a composition with other resins, or a copolymer with other monomers, or combining with heterogeneous resins (making multilayer filaments by co-extrusion), or further performing a particular heat treatment or stretch treatment to filaments (see for example, patent documents 1 to 4).

Meanwhile, as mentioned in the above, while various ameliorations are made for ameliorating performance or properties of polyvinylidenefluoride resin filaments used for fisheries supplies including fishing lines, their use is limited to surf fishing or capturing small fishes. On the other hand, for use as fisheries supplies such as fishing lines, reflecting the recent tendency of consumers' diet, capture of large fishes including tuna or marlin are also important and highly demanded. Weight of these large fishes usually exceeds 100 kg, and the impact after fishes have taken the bait are rapid and enormous. These fishes are usually captured by longline fishing with a main line and a bait attached-branch line. However, for big game fishing using filaments of fishing line, significant tensile strength at break and impact resistance are required. Even by enlarging only the filament diameter in order to enhance the tensile strength at break, the tensile elongation at break that moderate impact resistance does not become appropriate. In filaments with a large diameter, cavities are often generated when formed. Thus, only few experiments to ameliorate filaments for fishing lines are made heretofore, and almost none is disclosed in patent publications.

In patent document No. 5, it is disclosed that a copolymer resin fiber of vinylidenefluoride and hexafluoropropylene, wherein a crystal structure with a particular parameter is determined is used as polyvinylidenefluoride resin filament with a large diameter of 0.5 mm or more, in order to avoid monofilament breakage against the rapid impact force when catching heavy weight fishes.

From this technical situation, universal fishing methods for capturing efficiently and surely large fishes including tuna or marlin, which are highly consumed recently, are becoming important. Responding to this, in order to assure capture of large fishes with fishing line made by polyvinylidenefluoride resin, development of polyvinylidenefluoride resin filament as fishing line for capturing large fishes, wherein even by enhancing significantly the tensile strength at break by enlarging the filament diameter than that of usual fishing line, up to a large diameter of 0.5 to 3 mm, an appropriate tensile elongation at break can be obtained, so that the rapid and enormous impact generated when large fishes have taken the bait can be reduced, and a homogenous fiber structure can be obtained which generates almost no inner cavity when forming a filament with a large diameter, is awaited.

[Patent document 1] Japanese Patent Publication No. 4-61087 (Claims; page 1, left column, lines 18-19)

[Patent document 2] WO02/064867 (page 1, lines 21-26; page 22, lines 3-5)

[Patent document 3] Japanese Laid-Open Patent Application No. 7-292519 (Abstract)

[Patent document 4] Japanese Laid-Open Patent Application No. 5-148707 (Abstract)

[Patent document 5] Japanese Laid-Open Patent Application No. 7-216635 (Abstract; claims; paragraphs 0003-0005)

DISCLOSURE OF THE INVENTION

Object of the Present Invention

Regarding the technical field of the polyvinylidenefluoride resin filament as fisheries supplies including fishing line, as described in the above paragraphs 0002-0005, as universal fishing methods for capturing efficiently and surely large fishes including tuna or marlin, with high-consumer demand in recent days, are becoming important as described in paragraph 0005, the object of the present invention is to develop a polyvinylidenefluoride resin filament as fishing line, wherein even by enhancing significantly the tensile strength at break by enlarging the filament diameter than that of usual fishing line, an appropriate tensile elongation at break can be obtained, so that the rapid and incredible impact generated when large fishes have taken the bait can be reduced, and a homogenous fiber structure can be obtained which generates almost no inner cavity when forming a filament with a large diameter, in order to assure capture of large fishes with fishing lines made by a polyvinylidenefluoride resin filament.

Means to Solve the Object

The present inventors made a keen study to resolve the above mentioned objects, to find out a polyvinylidenefluoride resin filament as fishing line for capturing large fishes, wherein even by enhancing significantly the tensile strength at break by enlarging the filament diameter, an appropriate tensile elongation at break can be obtained, so that the rapid and enormous impact generated when large fishes have taken the bait can be reduced, and almost no inner cavity is generated when forming a filament with a large diameter. They sought a new method from multilateral considerations from various points of view, made demonstration and comparison from experimental searches and trials, including fiber construction of materials such as intrinsic viscosity or stretch of the polyvinylidenefluoride resin filament; variation and quantitative ratio of copolymerization and comonomers; variation and relative proportions of the components, in case of making a composition; or making multilayer with heterogeneous resins; and further, particular heat treatment or elongation relaxation treatment of filaments.

During this process, the present inventors found out that by blending a particular copolymer for forming polyvinylidenefluoride resin filament, and by determining the intrinsic viscosity or the component ratio of comonomer of the composition, even by enlarging significantly the filament diameter to enhancing significantly the tensile strength at break, an appropriate tensile elongation at break can be obtained, and that almost no inner cavity is generated when forming a filament with a large diameter. Thus, they developed the polyvinylidenefluoride resin monofilament that can efficiently and surely capture large fishes of the present invention.

In the present invention, as a fundamental method, fluoroalkene is selected as comonomer component, a polyvinylidenefluoride resin (a) and the copolymer of vinylidenefluoride and fluoroalkene (b) are set as composition ingredients, and with a polyvinylidenefluoride resin component (A) that specifies the ingredient mass ratio of polyvinylidenefluoride resin (a) and the copolymer of vinylidenefluoride and fluoroalkene (b) to 25/75 to 75/25, a polyvinylidenefluoride resin monofilament is formed from this component. As a second embodiment of the present invention, fluoroalkene is selected as a comonomer component, and a polyfluorovinylende resin monofilament is formed with a copolymer of a specified vinylidenefluoride and fluoroalkene (B).

Further, with a polyvinylidenefluoride resin (a) and the copolymer of vinylidenefluoride and fluoroalkene (b) as composition ingredients, by specifying the fluoroalkene content to 1 mass % or more and less than 6 mass %, and the intrinsic viscosity of the composition is 1.3 dl/g or more.

Moreover, as the second embodiment of the present invention, when fluoroalkene is selected as comonomer component, and the polyvinylidenefluoride resin monofilament is formed with a particular copolymer of vinylidenefluoride and fluoroalkene (B), it is determined similarly.

Examples and Comparative Examples in the following will demonstrate that the specification of these levels is reasonable and significant.

As for a more specific and preferable embodiment, the reason of which will be mentioned in the following, the fluoroalkene content is 1 to 5 mass %, hexafluoropropylene is preferable for fluoroalkene as copolymer, and the polyfluorovinyledene resin monofilament of the present invention is used as fishing lines in fisheries supplies, and is preferably used as fishing lines for capturing large fishes including tuna or marlin. As for preferred embodiment of monofilament, monofilament diameter is 0.5 to 3 mm, and generation of cavity with a rough diameter of 0.5 mm or more is 1 or less per 10 m of unoriented monofilament, the tensile strength at break is 600 Mpa or more, the tensile elongation at break is 15 to 35%, the crimp strength at break is 600 MPa or more and the crimp elongation at break is 20 to 30%.

In the present invention having the above constitution and embodiment, even by enhancing significantly the tensile strength at break by enlarging the filament diameter than that of usual fishing line up to a large diameter of 0.5 to 3 mm, usually, increase and decrease of the tensile strength at break and the tensile elongation at break is contradicting, an appropriate tensile elongation at break can be obtained, so that the rapid and enormous impact generated when large fishes have taken the bait can be reduced. Further, when forming a filament with a large diameter, usually, in proportion to the diameter, the number of cavity generated in the filament increases unavoidably, and the size of the cavity also enlarges unavoidably, homogenous fiber construction wherein almost no cavity is generated inside at the time of forming can be obtained. These are novel and predominant results.

The polyfluoropolyvinylidene resin monofilament of the present invention, mentioned in the above, can be manufactured by melt-extruding a polyvinylidenefluoride resin composition (A) and the like, comprising a polyvinylidenefluoride resin (a) and a copolymer of vinylidenefluoride and fluoroalkene (b) as composition ingredients; by rapid quenching in a cold medium of a particular temperature; by stretching in a medium of a particular temperature after preheating in a medium of a particular temperature; and after performing a two-step stretch according to need, by moderating the stretch in a medium of a particular temperature.

Meanwhile, by investigating every patent document of the prior art described in paragraphs 0002 to 0005, a polyvinylidenefluoride monofilament, constituted by a composition comprising 80 to 97 weight % of polyvinylidenefluoride homopolymer with a intrinsic viscosity of 1.15 to 1.28, and 20 to 3 weight % of polyvinylidenefluoride copolymer with a intrinsic viscosity of 0.70 to 1.10 is disclosed in Patent document 1. However, its intrinsic viscosity differs from that of the polyvinylidenefluoride resin monofilament of the present invention. The present invention has a particular action and effect described in paragraph 0011 for fishing line with a large diameter for capturing large fishes, and the conventional art described in prior art 1 does not suggest the present invention. Further, in other prior arts, almost no trials for ameliorating polyvinylidenefluoride resin monofilament for fishing line for capturing large fishes have been made nor disclosed in patent publications, thus, the constitution and features of the present invention described briefly in paragraphs 0009 to 0011 cannot be found out.

The process of finding out the present invention, and the basic constitutions and features of the present invention have been schematically described in the above. Here, when the present invention is overviewed, the present invention consists of the following invention units, wherein the inventions [1] and [4] are basic inventions, while other inventions give shape and embodiment to the basic inventions. (Meanwhile, "the present invention" refers to the group of inventions as a whole.)

[1] A polyvinylidenefluoride resin monofilament, comprising a polyvinylidenefluoride resin (a) and a copolymer of vinylidenefluoride and fluoroalkene (b) as composition ingredients, which is formed by a polyvinylidenefluoride resin composition (A) wherein the fluoroalkene content is 1 mass % or more and less than 6 mass %, and which has a monofilament diameter of 0.5 mm or more.

[2] The polyvinylidenefluoride resin monofilament according to [1], wherein the component mass ratio of the polyvinylidenefluoride resin (a) and the copolymer of vinylidenefluoride and fluoroalkene (b) is 25/75 to 75/25 and the intrinsic viscosity is 1.3 dl/g or more.

[3] A fishing line for capturing large fishes comprised of the polyvinylidenefluoride resin monofilament according to [1] or [2].

[4] A polyvinylidenefluoride resin monofilament, formed with a copolymer of vinylidenefluoride and fluoroalkene (B), wherein the fluoroalkene content is 1 mass % or more and less than 6 mass %, and which has a monofilament diameter of 0.5 mm or more.

[5] A fishing line for capturing large fishes comprised of the polyvinylidenefluoride resin monofilament according to [4], wherein the intrinsic viscosity is 1.3 dl/g or more.

[6] The polyvinylidenefluoride resin monofilament according to [2] or [4], wherein the fluoroalkene is hexafluoropropylene.

[7] The polyvinylidenefluoride resin monofilament or the fishing line for capturing large fishes according to any one of [1] to [6], wherein the monofilament diameter is 0.5 to 3 mm, and the generation of cavity with a rough diameter of 0.5 mm or more is 1 or less per 10 m of unoriented monofilament.

[8] The polyvinylidenefluoride resin monofilament or the fishing line for capturing large fishes according to any one of [1] to [7], wherein the monofilament diameter is 0.5 to 3 mm, there is no spread of cavity with a rough diameter of 0.5 mm or more in the fiber axis direction of the oriented monofilament resulting from generation of cavity in the unoriented monofilament, that the tensile strength at break is 600 MPa or more and the tensile elongation at break is 15 to 35%.

[9] The polyvinylidenefluoride resin monofilament or the fishing line for capturing large fishes according to [8], wherein the crimp strength at break is 600 MPa or more, and the crimp elongation at break is 20 to 30%.

[10] A method for manufacturing the polyvinylidenefluoride resin filament or the fishing line for capturing large fishes according to any one of [1] to [9], comprising the steps of melt-extruding a polyvinylidenefluoride resin composition (A) comprising a polyvinylidenefluoride resin (a) and a copolymer of vinylidenefluoride and fluoroalkene (b) as composition ingredients, or a copolymer of vinylidenefluoride and fluoroalkene (B); quenching in a cold medium of 70 to 150° C.; by stretching and moderating after preheating in a medium of 70° C. or more.

EFFECT OF THE INVENTION

In the present invention, even by enhancing significantly the tensile strength at break by enlarging the filament diameter of the polyvinylidenefluoride resin monofilament than usual, an appropriate tensile elongation at break can be obtained and even by making a filament with a large diameter, almost no inner cavity is generated at the time of forming, and in case cavities are formed, they are very small. Thus, a homogenous fiber structure can be obtained.

The polyvinylidenefluoride resin monofilament of the present invention can be preferably used for fishing lines in universal fishing methods, for capturing efficiently and surely large fishes including tuna and marlin which are highly consumed recently. Further, even by increasing significantly the tensile strength at break by enlarging significantly the filament diameter of the polyvinylidenefluoride resin monofilament than usual, an appropriate tensile elongation at break can be obtained, so that the rapid and enormous impact generated when large fishes have taken the bait can be reduced. Further, crimp strength at break is also good, and can possibly prevent monofilament breakage.

BEST MODE OF CARRYING OUT THE INVENTION

The present invention has been explained according to the fundamental constitution of the present invention as a means to solve the problems in the above, and in the following, the mode of carrying out the invention for the aforementioned invention groups will be specifically described in detail, especially for the compositions and properties of polyvinylidenefluoride resin monofilament.

1. Polyvinylidenefluoride Resin Composition (A)

(1) Fundamental Constitution of the Composition

The resin composition (A) of the present invention is a composition for forming and spinning a polyvinylidenefluoride resin monofilament, which comprises basically two components, that is a polyvinylidenefluoride resin (a) and a copolymer of vinylidenefluoride and fluoroalkene (b), as composition ingredients.

Beside the above ingredients, a little amount of resin component can be blended, or various additives usually used for polyvinylidenefluoride resin can be added as composition ingredients.

The ingredient mass ratio of the polyvinylidenefluoride resin (a) and the copolymer of vinylidenefluoride and fluoroalkene (b) is preferably determined to be 25/75 to 75/25.

When exceeding this range of composition ratio, generation of cavity further decreases while a sufficient tensile strength at break cannot be obtained, or if a sufficient tensile strength at break is obtained, generation of cavity would occur, neither of them being preferable. From this reason, the composition ratio of 30/70 to 70/30 is more preferable, and 40/60 to 60/40 is particularly preferable. The best mode is a composition comprising a copolymer (b) containing 6 mass % of hexafluoroproylene as comonomer, and a polyvinylidenefluoride resin (a), at a mass ratio of 50/50.

(2) Polyvinylidenefluoride Resin (a)

The polyvinylidenefluoride resin (a) of the present invention is a usual polyvinylidenefluoride homopolymer (homopolymer), that can be manufactured by suspension-polymerization or emulsification-polymerization of vinylidenefluoride by common methods. When the intrinsic viscosity of the composition is specified in the present invention, the composition is polymerized as a homopolymer having the necessary viscosity determined according to the viscosity level.

(3) Copolymer (b)

As for the copolymer (b) used as composition ingredient in the present invention, a copolymer of vinylidenefluoride and fluoroalkene is applied to retain the compatibility with polyvinylidenefluoride resin (a) or properties of polyvinylidenefluoride resin (a). This copolymer can be manufactured by common polymerization method.

The fluoroalkene content as comonomer is preferably determined as 1 mass % or more and less than 6 mass %, in the polyvinylidenefluoride resin composition. To fulfill this preferable determination, it is necessary to use a copolymer (b)

containing preferably 1.3 to 24 mass % of comonomer, more preferably 1.5 to 10 mass % for blending.

With this determination, and by performing the particular heat treatment, stretching and further the relaxation treatment, even by enlarging the filament diameter of the polyvinylidenefluoride resin monofilament up to 0.5 to 3 mm which is larger than usual, and by considerably enhancing the tensile strength at break, an appropriate tensile strength at break can be obtained. Further, a homologous filament structure wherein almost no inner cavity is generated at the time of forming can be obtained even with a filament with a large diameter.

In order to assure this action, the fluoroalkene content as comonomer is preferably 1 mass % or more and less than 6 mass %, more preferably 1 to 5 mass %. Further, it is particularly preferable to be 1.5 to 5.5 mass %, most preferably 2.0 to 5.0 mass %.

By reducing the comonomer content to less than 1 mass %, and down to near 0 mass % to be close to a homopolymer, a tensile strength at break close to that of homopolymer can be obtained, while cavity would be easily generated. In particular, in monofilaments with large diameter, generation frequency of cavity will significantly increase.

By increasing the comonomer content to 6 mass % or more, an opposite result would be obtained. Thus, in the present invention, the comonomer content is specified to be 1 mass % or more and less than 6 mass %; preferably 1 to 5 mass %, more preferably 1.5 to 5.5 mass %, and most preferably 2.0 to 5.0 mass %.

In the present invention, when the fluoroalkene content as comonomer in the polyvinylidenefluoride is determined to be 1 mass % or more and less than 6 mass %, the polyvinylidenefluoride resin monofilament of the present invention can be formed only with the polyvinylidenefluoride resin copolymer (B) without containing polyvinylidenefluoride resin homopolymer (By considering the polyvinylidenefluoride resin composition (A) being the first embodiment of the present invention, this would be the second embodiment. In other words, it corresponds to the invention unit [4] described in paragraph 0015, and to the following examples 11, 13 and 14.)

The characteristics of the present invention described in the above, are estimated to affect the crystal constitution or distribution of the non-crystal part of the copolymer of vinylidenefluoride and fluoroalkene (b), and further of the polyvinylidenefluoride resin monofilament, due to the fluoroalkene comonomer.

Further, when homopolymer is blended with copolymer, micro homopolymers will be dispersed in the copolymer as a matrix, and by stretching the unoriented monofilament, a constitution wherein homopolymers are dispersed in the oriented monofilament as an enhancing fiber (what is called whisker) for the copolymer would be made. It is believed that the monofilament of the present invention with a high strength and an appropriate stretching is thought to be obtained with that constitution.

As for comonomers, in order to retain compatibility with the copolymer (b) with polyvinylidenefluoride resin (a) or properties of polyvinylidenefluoride resin (a) in the composition (A), a fluoroalkene similar to the main monomer is used.

Specifically, fluoroalkene, wherein 1 or more hydrogen atom is replaced with fluorine atom in alkene (olefin) with about 2 to 10 carbons, can be exemplified; tetrafluoroethylene, fluoroethylene, trifluoroehylene and hexafluoropropylene can be used, and trifluoroethylene chloride can also be exemplified. When the number of carbons exceeds 10, compatibility of the copolymer with polyvinylidenefluoride resin (a) decreases, which has a bad effect to various strengths of the filament, thus not preferable.

Among these, hexafluoropropylene is preferably used, and as the molecular constitution is spatially bulky due to the replacement with 6 fluorine atoms, it is preferable as it is possible to decrease the crystallization of copolymers or composed filaments, and to add flexibility.

(4) Intrinsic Viscosity

As for viscosity of resin composition (A) of the present invention, as the tensile strength at break is not sufficiently obtained when the intrinsic viscosity is less than 1.3 dl/g, and in particular as the tensile strength at break is not sufficient for fishing line for capturing large fishes, the intrinsic viscosity is preferably determined to 1.3 dl/g or more. When the viscosity is too high, forming becomes difficult, thus the upper limit is preferably 1.8 dl/g. When the viscosity (polymerization level) is low, the strength is hardly obtained, thus the viscosity is more preferably 1.4 to 1.7 dl/g.

The intrinsic viscosity is measured by dissolving the filament sample into N, N-dimethylformamide at a concentration of 0.4 g/dl, and the intrinsic viscosity of the solution at 30° C. is measured with a Ubbelohde viscometer.

(5) Additives

As for various additives of resin composition, processing materials used generally for polyvinylidenefluoride resin, including plasticizer, nuclear agent, antioxidant, ultraviolet absorbent, dye, pigment, heat stabilizer, light stabilizer, filling agent, inner mold lubricant, delustering agent, conductive additive, antistatic controller, antistatic agent, lubricant can be used in order to further enhance properties, and to add various properties.

2. Polyvinylidenefluoride Resin Monofilament (1) Filament

The filament of the present invention is formed by extruding and spinning a polyvinylidenefluoride resin composition (A) or a polyvinylidenefluoride resin (B) with such an extrusion machine in molten state, and mainly is used in a form of monofilament.

The filament of the present invention is called unoriented monofilament when extruding and spinning are performed while not stretched; and it is called oriented monofilament when stretching treatment is performed.

As for the preferred embodiment of the monofilament, the monofilament diameter is 0.5 mm to 3 mm, generation of cavity with a rough diameter of 0.5 mm or more is 1 or less per 10 m of unoriented monofilament, the tensile strength at break is 600 MPa or more, and the tensile elongation at break is 15 to 35%.

As for the monofilament diameter, as a significant tensile strength at break is necessary for fishing lines for capturing large fishes, a monofilament diameter of 0.5 to 3 mm (more definitely from 0.50 to 3.0 mm) that is significantly larger than a normal fishing line is preferable. For fishing lines for capturing large fishes, the monofilament diameter is preferably 0.60 to 2.7 mm, more preferably 0.70 to 2.5 mm.

In forming normal monofilament, the number of cavity generation or the size of the cavities increase as the monofilament diameter is enlarged. However, in the filament of the present invention, even it has a significant large diameter, by using a particular polyvinylidenefluoride resin composition or copolymer and performing a particular quenching condition at the time of spinning, it is possible to almost eliminate generation of cavity that decrease significantly the mechanical strength, and to reduce the generation of cavity with a rough diameter of 0.5 mm or more to 1 or less per 10 m of unoriented monofilament. Preferably it is 1 or less per 15 m, and more preferably 1 or less per 20 m.

Meanwhile, the cavity has not always a globular shape, and for rough standard of the size, the greatest dimension (longest diameter) is evaluated as rough diameter.

For oriented monofilament, a filament without distribution of cavity with a rough diameter of 0.5 mm or more in the fiber axis direction of an oriented monofilament, resulting from the generation of cavity in unoriented monofilament is preferable. Specifically, it is possible to set the distribution of cavity to 1 or less per 10 m of oriented monofilament. Preferably it is 1 or less per 50 m, more preferably 1 or less per 150 m.

As for homopolymers of polyvinylidenefluoride, the crystallization speed is faster and the crystallization level is high, and the mold shrinkage factor is larger compared to that of other resins, when extruding and spinning, cooling and solidifying a monofilament in molten state from an extrusion machine. Therefore, cavities resulting from mold shrinkage, called generally "pithy tissue", are generated easily in the center part of the monofilament. In particular, generation of cavity increases when quenching. Further, when the difference of coolant condition between the surface and the inner part is large, generation of cavity increases. Thus, when monofilament diameter becomes larger as for fishing lines for large fishes, generation of cavity increases naturally.

When generation of cavity increases, not only mechanical properties of oriented monofilament decreases, but when cavity with a rough diameter of 0.5 mm or more is generated in unoriented monofilament at the time of spinning, the monofilament breaks by stretching, and further stretching becomes impossible. Further, when generation of cavity becomes significant, cavities communicate each to each, and spinning would be disabled, and stretching with a determined magnification would be completely impossible.

On the other hand, if it is cooled slowly in order to prevent generation of cavity, crystallization of unoriented monofilament develops and the strength or elongation level would not be high.

Therefore, it is preferable to use copolymers for polyvinylidenefluoride resin filament to be used for capturing large fishes. In particular, if a comonomer having a bulky substituent in the side chain such as hexafluoropropylene is used, the crystallization speed and the crystallization level decrease, and the mold shrinkage factor would not be as large as homopolymers, thus cavity are hardly generated. However, as the crystallization level is low, the strength is low, while the elongation level is too high for practical use. If tension is applied due to an excess of elongation, there would be problems including whitening of filaments resulting in a thinner monofilament diameter.

According to this knowledge, the present invention applies a particular polyfluorovinyledene resin composition (A) and the like in which the comonomer level is adjusted, and which is made a particular composition with a homopolymer.

Further, as for the monofilament of the present invention, as it has a significant large diameter, and a particular polyvinylidenefluoride resin monofilament is used and a particular stretching and heating treatment are performed, even by enhancing significantly the tensile strength at break, the tensile elongation at break can be also enhanced, and a tensile strength at break of 600 MPa or more, and an tensile elongation at break of 15 to 35% can be obtained. For fishing lines for large fishes, the tensile strength at break is preferably 625 to 900 MPa, more preferably 650 to 850 MPa, and the tensile elongation at break is preferably 20 to 33%.

(2) Fishing Lines for Capturing Large Fishes

The monofilament of the present invention can be used as fishing lines for capturing large fishes, and the features of the monofilament of the present invention can be exerted mostly in that use.

For assuring capture of large fishes by using fishing lines made by filament, the filament diameter is enlarged significantly compared to that of normal fishing line, up to 0.5 mm to 3 mm. Thus, the tensile strength at break is significantly enhanced up to 600 MPa or more, the tensile elongation at break up to 15 to 35%, as well as enhancing the crimp strength at break up to 600 MPa or more, and the crimp elongation at break up to 20 to 30%. Thus, monofilament breakage can be prevented by resisting to rapid and enormous impact generated when large fishes have taken the bait. As the elongation level is within an appropriate range, the elasticity of the filament is high and the fishing line can be easily handled.

(3) Other Use

The monofilament of the present invention can be used for various purposes other than fishing lines for capturing large fishes, with their excellent filament strength, etc.

As the polyvinylidenefluoride resin monofilament has also a characteristic that does not deteriorate by ultraviolet, it can be used for wire or rope used outdoor which needs to be weather resistant.

Further, in order to cope with damage by birds that spread in urban area recently, it is possible to cover balconies of buildings or houses with the polyvinylidenefluoride resin monofilament of the present invention as filaments or nets, and to prevent damage by birds by creating a sense of fear to inhibit aviation with the transparent monofilament, and sense of vigilance with the photoluminescence of the monofilament and keeping birds off.

3. Manufacture of Polyvinylidenefluoride Resin Monofilament

The monofilament of the present invention can be manufactured by melt-extruding a polyvinylidenefluoride resin composition (A) and the like, and by performing quenching and preheating, then stretching and further relaxation treatment. However, in the present invention, as a feature of the present invention, the manufacturing process is performed at a particular temperature and with a particular treatment condition.

Specifically, the polyvinylidenefluoride resin composition (A), or a copolymer of vinylidenefluoride and fluoroalkene (B) is melt-extruded, quenched in a cold medium of 70 to 150° C., then preheated to 70° C. or more, stretched to 5 to 7-fold in a medium of 160 to 170° C., and by performing a two-step stretch according to need, and relaxation of 5 to 15% in a medium of 70 to 165° C., and the filament is manufactured.

The quenching temperature is preferably 170° C. or below which is under the melting point of polyvinylidenefluoride resin, more preferably 70 to 140° C., and further preferably 80 to 115° C. Preheating temperature is preferably 170° C. or below which is equal to or lower than the melting point of polyvinylidenefluoride resin, more preferably 70 to 140° C., and further preferably 75 to 105° C. Stretching condition is preferably 5.3 to 6.7-fold at 161 to 169° C., and more preferably 5.5 to 6.5-fold at 162 to 168° C. Relaxation condition is preferably 5 to 13% at 75 to 165° C., and more preferably 5 to 12% at 80 to 160° C.

As for the more preferable method for manufacturing in detail, it is performed in the following process, and with the quenching in the process (iii) and the preheating in (iv), the remarkable effect of the present invention can be exerted.

Moreover, as the present invention relates to a monofilament with a large diameter, similarly to a monofilament for fishing line which is generally used, when a thick unoriented monofilament is stretched rapidly in a stretch bath, the temperature difference between the monofilament surface and the inner part would become larger, thus a homogenous stretching cannot be performed and a monofilament with satisfactory properties cannot be obtained. In order to resolve this problem, it is necessary to provide a heat bath to perform preheating before the stretch bath and to reduce the temperature difference between the monofilament surface and the inner part.

(i) As raw materials, homopolymer and copolymer in powder form are mixed homogenously in a tumbler at a mass ratio of 25/75 to 75/25, and pelleted with a Ø50 mm-extrusion machine attached with a full flight screw at a extrusion nozzle-temperature of 290° C.

(ii) The pelleted raw materials are spinned with a Ø50 mm-extrusion machine attached with a full flight screw and a gear pump with a nozzle of 06 to 10 mm at 280 to 300° C., at 230 to 300° C.

(iii) By quenching in a cold medium of 70 to 120° C. (water; oil such as silicone oil, polyethylene glycol, glycerin of alcohols), unoriented monofilament is obtained.

If it is over-quenched, generation of cavity occurs and oriented monofilament would be hard to obtain. Contrarily, if it is cooled too slowly to prevent generation of cavity, crystallization of the unoriented monofilament advances and stretching is prevented, thus the exerted strength would be low.

(iv) Unoriented monofilaments are preheated in a heat medium (water, oil or alcohols) of 70 to 110° C., and stretched to 5.8 to 6.4-fold in a heat medium (oil or alcohols) of 164 to 167° C.

(v) Oriented monofilaments are moderated by 5 to 10% in a heat medium (water, oil or alcohols) of 80 to 160° C. When the relaxation temperature or relaxation ratio is low, relaxation effect is not observed, and the monofilament will harden, and it will be easily marked, and it would not be practical to use. On the other hand, if the relaxation temperature is too high, the monofilament surface will molten and the exerted strength will be not sufficient.

EXAMPLE

In the following, examples of the present invention will be disclosed and compared with the comparative examples, and the present invention will be shown more specifically to further reveal the constitution of the present invention in order to demonstrate the reasonability and the significance of each constitution of the present invention.

[Raw Material Used]

Polyvinylidenefluoride resin: Kureha Chemical Industry Co. Ltd. (presently Kureha Corporation)

Homopolymer (1): intrinsic viscosity 1.50 dl/g
  Composition VDF=100

Homopolymer (2): intrinsic viscosity 1.70 dl/g
  Composition VDF=100

Copolymer (1): Intrinsic viscosity 1.48 dl/g
  Composition VDF/HFP=94/6

Copolymer (2): Intrinsic viscosity 1.48 dl/g
  Composition VDF/HFP=96/4

Copolymer (3): Intrinsic viscosity 1.13 dl/g
  Composition VDF/HFP=98/2

(VDF: vinylidenefluoride; HFP: hexafluoropropylene)

[Test Methods]

i) Comonomer Content

UNITY INOVATION 500NMR (nuclear magnetic resonance device) (Varian Inc.) was used to measure comonomer content in the monofilament at a frequency of 500 MHz by $^{19}$F-NMR method.

Resin test sample was dissolved in N, N-dimethylformamide to prepare a test solution, which was set to NMR device. Content of hexafluoropropylene as comonomer ingredient was calculated from the molecular ratio of hexafluoropropylene/vinylidenefluoride, and the total of integration level of signal intensity of each region by determining the region around 69 to 75 ppm as a signal deriving from $CF_3$, and the region around 91 to 119 ppm as a signal derived from $CF_2$.

ii) Intrinsic Viscosity

Filament sample was dissolved into N, N-dimethylformamide at a concentration of 0.4 g/dl, and the intrinsic viscosity of the solution at 30° C. was measured with a Ubbelohde viscometer.

iii) Measurement of Tensile Strength and Elongation at Break

Strograph RII tensile strength tester (Toyo Seiki Seisaku-Sho, Ltd.) was used, and the tensile strength as a strength when dried was measured at sample length-300 mm, tensile speed-300 mm/min, measurement count-5 in a room at 23° C.-65% RH. At that time, the sample is fixed with a jaws by winding around 3 times to a cylinder with a diameter of 19 mm attached ahead of each jaws in the upper and bottom part, in order to prevent breakage with the jaws.

The sample length here relates to the length from the center of the cylinder attached to the upper jaw, to the center of the cylinder attached to the lower jaw.

Elongation level recorded by the measurement machine includes the slippage due to the monofilament elongation in the cylinder part. Thus, in order to obtain the actual elongation level, the boundary between the winding part of the upper cylinder and the measuring part is marked, the slippage is read, and a level which is the double of the slippage is determined as the slippage level at the upper and lower winding parts, and the level subtracted from the measured elongation is set as the actual elongation level to calculate the elongation level.

iv) Measurement of Crimp Strength and Elongation at Break

Strograph RII tensile strength tester (Toyo Seiki Seisaku-Sho, Ltd.) was used, and the crimp strength at break was measured at sample length-300 mm, tensile speed-300 mm/min, measurement number-5 in a room at 23° C.-65% RH. At that time, after making rings to both end parts of the monofilament to be fixed surely to a cylinder with a diameter of 19 mm, attached ahead of each jaws in the upper and lower parts, a mechanism to fix the ring crimp by metal (Fuji Kizai Co. Ltd.) by caulking with a handpressor (of the same manufacturer). Measurement was made by hanging the rings at both ends of the sample to the cylinder of the jaws part of upper and lower parts.

The sample length here relates to the length from the center of the cylinder attached to the upper jaws, to the center of the cylinder attached to the lower jaws.

Examples 1 to 2

Powder of homopolymer (1)/copolymer (1) was blended at a mixing ratio of 50/50 and 30/70, and pelleted, then used as raw material.

The composition was injected in an extrusion machine, melt-kneaded at an extrusion temperature of 230 to 290° C., quenched in a cold medium of 90° C., and monofilament that is not oriented was obtained. Then, by preheating in a heated glycerin of 100 to 105° C., the monofilament was stretched to 6.4-fold through a heated glycerin of 164° C. Further, relaxation treatment of 5 to 6% in a heated glycerin of 120 to 130° C. was performed, and an oriented monofilament with a diameter of 1.47 to 1.50 mm was obtained.

Examples 3 to 6

Powder of homopolymer (2)/copolymer (1) was mixed at a mixing ratio of 50/50, and pelleted, then used as raw material.

The composition was melt-kneaded at an extrusion temperature of 230 to 290° C., quenched in a cold medium of 80 to 105° C., and unoriented monofilament was obtained. Then, by preheating in a heated glycerin of 75 to 100° C., the monofilament was stretched to 5.8 to 6.4-fold through a heated glycerin of 165 to 167° C. Further, relaxation treatment of 7 to 10% in a heated glycerin of 80 to 160° C. was performed, and an oriented monofilament with a diameter of 0.83 to 1.81 mm was obtained.

Example 7

Raw material was homopolymer (2)/copolymer (1)=40/60, and oriented monofilament was obtained with the spinning stretching conditions of Table 2.

Example 8

Raw material was homopolymer (2)/copolymer (1)=30/70, and oriented monofilament was obtained with the spinning stretching conditions of Table 2.

Example 9

Raw material was homopolymer (2)/copolymer (2)=50/50, and oriented monofilament was obtained with the spinning stretching conditions of Table 2.

Example 10

Raw material was homopolymer (2)/copolymer (2)=30/70, and oriented monofilament was obtained with the spinning stretching conditions of Table 2.

Example 11

Raw material was copolymer (2), and oriented monofilament was obtained with the spinning stretching conditions of Table 2.

Example 12

Raw material was homopolymer (1)/copolymer (1)=75/25, and oriented monofilament was obtained with the spinning stretching conditions of Table 2.

Example 13

Raw material was copolymer (3), and oriented monofilament was obtained with the fiber forming elongation condition of Table 2.

Example 14

Raw material was copolymer (3), and oriented monofilament was obtained with the spinning stretching conditions of Table 2.

Comparative Example 1

Pellet of copolymer (1) was used as raw material.

The composition was injected in an extrusion machine, melt-kneaded at an extrusion temperature of 230 to 290° C., quenched in a glycerine of 105° C., and unoriented monofilament was obtained. Then, by preheating in a heated glycerin of 77.5° C., the monofilament was oriented to 6.2-fold through a heated glycerin of 160° C. Further, relaxation treatment of 9% in a heated glycerin of 130° C. was performed, and an oriented monofilament with a diameter of 1.48 mm was obtained.

Comparative Example 2

By using homopolymer (1) as raw material, sampling was performed with spinning and stretching conditions of Table 2. When cooling and fixing the monofilament in a spinning oriented state, cavities communicated vertically are generated and thus, stretching could not be performed.

Comparative Example 3

By using homopolymer (1)/copolymer (2)=50/50 as raw material, sampling was performed with spinning and stretching conditions of Table 2. As the monofilament in a spinning oriented state was quenched to 60° C., a large cavity was generated inside the unoriented monofilament, and thus, stretching could not be performed.

Compounding ratio of raw materials, resin viscosity, copolymer content for Examples 1 to 14 and Comparative Examples 1 to 3 are shown in Table 1.

Spinning conditions for Examples 1 to 14 and Comparative Examples 1 to 3 are shown in Table 2.

Generation of cavities in Examples 1 to 14 and Comparative Examples 1 to 3 is shown in Table 3.

Measurement results of the tensile strength and elongation at break, and crimp strength and elongation at break are shown in Table 4.

TABLE 1

|  | Homo Polymer (1) | Homo polymer (2) | Copolymer (1) | Copolymer (2) | Copolymer (3) | Resin Viscosity (dl/g) | Comonomer Content (%) |
| --- | --- | --- | --- | --- | --- | --- | --- |
| Example 1 | 50 |  | 50 |  |  | 1.49 | 3.0 |
| Example 1 | 30 |  | 70 |  |  | 1.49 | 4.2 |
| Examples 3–6 |  | 50 | 50 |  |  | 1.59 | 3.0 |

TABLE 1-continued

| | Homo Polymer (1) | Homo polymer (2) | Copolymer (1) | Copolymer (2) | Copolymer (3) | Resin Viscosity (dl/g) | Comonomer Content (%) |
|---|---|---|---|---|---|---|---|
| Example 7 | | 40 | 60 | | | 1.57 | 3.6 |
| Example 8 | | 30 | 70 | | | 1.55 | 4.2 |
| Example 9 | | 50 | | 50 | | 1.59 | 2.0 |
| Example 10 | | 30 | | 70 | | 1.57 | 2.8 |
| Example 11 | | | | 100 | | 1.48 | 4.0 |
| Example 12 | 75 | | 25 | | | 1.50 | 1.5 |
| Example 13 | | | | | 100 | 1.13 | 2.0 |
| Example 14 | | | | | 100 | 1.13 | 2.0 |
| Comparative Example 1 | | | 100 | | | 1.48 | 6.0 |
| Comparative Example 2 | 100 | | | | | 1.50 | 0 |
| Comparative Example 3 | | 50 | 50 | | | 1.49 | 3.0 |

TABLE 2

| | Quench bath | | preheating | stretching | | relaxation | | Filament |
|---|---|---|---|---|---|---|---|---|
| | Cooling medium | temp (°C.) | Temp (°C.) | Rate (%) | Temp (°C.) | Rate (%) | Temp (°C.) | diameter (mm) |
| Example 1 | warm water | 90 | 100 | 6.4 | 164 | 5.0 | 130 | 1.47 |
| Example 2 | warm water | 90 | 105 | 6.4 | 164 | 6.0 | 120 | 1.50 |
| Example 3 | glycerin | 80 | 75 | 5.9 | 165 | 10.0 | 155 | 0.83 |
| Example 4 | glycerin | 105 | 78 | 5.9 | 165 | 10.0 | 160 | 1.48 |
| Example 5 | glycerin | 115 | 80 | 5.8 | 167 | 10.0 | 150 | 1.81 |
| Example 6 | warm water | 90 | 100 | 6.4 | 166 | 7.0 | 80 | 1.47 |
| Example 7 | warm water | 90 | 100 | 6.4 | 166 | 7.0 | 80 | 1.49 |
| Example 8 | warm water | 90 | 100 | 6.4 | 166 | 7.0 | 80 | 1.48 |
| Example 9 | warm water | 90 | 100 | 6.1 | 164 | 7.0 | 130 | 1.50 |
| Example 10 | warm water | 90 | 100 | 6.1 | 164 | 7.0 | 130 | 1.50 |
| Example 11 | warm water | 90 | 90 | 6.2 | 164 | 6.0 | 130 | 1.50 |
| Example 12 | warm water | 90 | 100 | 6.4 | 164 | 5.0 | 130 | 1.47 |
| Example 13 | warm water | 70 | 70 | 6.2 | 168 | 5.0 | 165 | 0.57 |
| Example 14 | warm water | 70 | 70 | 6.1 / 1.05 | 168 / 171 | 5.0 | 165 | 0.55 |
| Comparative Example 1 | glycerin | 105 | 78 | 6.2 | 160 | 9.0 | 130 | 1.48 |
| Comparative Example 2 | warm water | 90 | | | | | | |
| Comparative Example 3 | warm water | 60 | | | | | | |

Meanwhile, the level in the lower line for stretching of Example 14, is the two-step stretch level.

TABLE 3

| | Quench bath | | Cavity generation |
|---|---|---|---|
| | Cooling medium | temp (°C.) | |
| Example 1 | warm water | 90 | no generation |
| Example 2 | warm water | 90 | no generation |
| Example 3 | glycerin | 80 | no generation |
| Example 4 | glycerin | 105 | no generation |
| Example 5 | glycerin | 115 | no generation |
| Example 6 | warm water | 90 | no generation |
| Example 7 | warm water | 90 | no generation |
| Example 8 | warm water | 90 | no generation |
| Example 9 | warm water | 90 | no generation |
| Example 10 | warm water | 90 | no generation |
| Example 11 | warm water | 90 | no generation |

TABLE 3-continued

| | Quench bath | | |
|---|---|---|---|
| | Cooling medium | temp (° C.) | Cavity generation |
| Example 12 | warm water | 90 | no generation |
| Example 13 | warm water | 70 | no generation |
| Example 14 | warm water | 70 | no generation |
| Comparative Example 1 | glycerin | 105 | no generation |
| Comparative Example 2 | warm water | 90 | Generation of communicated cavities |
| Comparative Example 3 | warm water | 60 | Generation of cavities with Ø0.5 mm or more |

TABLE 4

| | Tensile strength and elongation at break Fracture strength MPa Fracture elongation % | | Crimp strength and elongation at break Fracture strength MPa Fracture elongation % | |
|---|---|---|---|---|
| Example 1 | 678 | 26 | 709 | 23 |
| Example 2 | 633 | 22 | | |
| Example 3 | 712 | 30 | 704 | 35 |
| Example 4 | 733 | 32 | 735 | 33 |
| Example 5 | 724 | 32 | 744 | 35 |
| Example 6 | 730 | 20 | | |
| Example 7 | 697 | 26 | | |
| Example 8 | 673 | 25 | | |
| Example 9 | 742 | 26 | | |
| Example 10 | 673 | 22 | | |
| Example 11 | 623 | 33 | 633 | 30 |
| Example 12 | 714 | 26 | | |
| Example 13 | 656 | 30 | | |
| Example 14 | 765 | 28 | | |
| Comparative Example 1 | 584 | 36 | 574 | 38 |
| Comparative Example 2 | | | | |
| Comparative Example 3 | | | | |

[Discussion of the Results of the Examples and Comparative Examples]

The above Examples and Comparative examples have been compared. The polyvinylidenefluoride resin monofilament of the present invention comprises a polyvinylidenefluoride resin (a) and a copolymer of vinylidenefluoride and fluoroalkene (b) as composition ingredient, by determining the ingredient mass ratio of the polyvinylidenefluoride resin (a) and the copolymer of vinylidenefluoride and fluoroalkene to 25/75 to 75/25, and formed by a polyvinylidenefluoride resin composition (A) wherein the fluoreolefin content is 1 mass % or more and less than 6 mass %, and the intrinsic viscosity is preferably 1.3 dl/g or more; or by a copolymer of vinylidenefluoride and fluoroalkene (B) wherein the fluoroalkene content is 1 mass % or more and less than 6 mass %, and the intrinsic viscosity is preferably 1.3 dl/g or more. Thus, even by enhancing significantly the tensile strength at break by enlarging the filament diameter than usual, an appropriate tensile elongation at break can be obtained and almost no inner cavity is generated at the time of forming even when the filament has a large diameter, and in case cavities are formed, they are very small. Thus, a homogenous fiber structure can be obtained. Therefore, the polyfluorovinilydene resin monofilament of the present invention can be preferably used for fishing lines in universal fishing methods, for capturing efficiently and surely large fishes including tuna or marlin. Further, it has been clarified that the crimp strength and elongation at break are also good.

Specifically, in all of the Examples 1 to 14 (in Examples 11, 13 and 14, as it is described in paragraph 0022, polyvinylidenefluoride resin homopolymer is not included and it is formed only with comonomer (B)), the tensile strength at break and the crimp strength at break are significantly high, the tensile elongation at break and the crimp elongation at break are appropriate, and almost no cavity is generated, and in case cavities are formed, they are very small.

Filament of the Comparative Example 1 is formed only with a copolymer of polyfluorovynilidene resin, and as the comonomer content is 6 mass %, almost no cavity is generated, and in case cavities are formed they are very small. However, the tensile strength at break and the crimp strength at break is too low for capturing large fishes, the tensile elongation at break and crimp elongation at break are excessive, and thus the filament whitens and becomes thin when pulling in large fishes. Therefore, it is not appropriate for capturing large fishes.

In Comparative Example 2, as a homopolymer of polyvinylidenefluoride resin is used, communicated cavities are generated, and breakage occurs when stretched, and oriented monofilament can not be obtained.

In Comparative Example 3, since spinning conditions of the filament do not meet the constitution of the present invention, generation of cavities often occur, and rupture occur when stretched, and oriented monofilament can not be obtained.

By considering the above results and discussion, reasonability and significance of the constitution of the present invention have been demonstrated, and it can be said that the present invention has a remarkable superiority compared to conventional technologies.

The invention claimed is:

1. A polyvinylidenefluoride resin monofilament, comprising:
    a polyvinylidenefluoride resin (a); and
    a copolymer of vinylidenefluoride and fluoroalkene (b),
    wherein the polyvinylidenefluoride resin monofilament is formed by a polyvinylidenefluoride resin composition (A) including (a) and (b) as composition ingredients,
    wherein the fluoroalkene content in the polyvinylidenefluoride resin monofilament is 1 mass % or more and less than 6 mass %, and the polyvinylidenefluoride resin monofilament has a monofilament diameter of 0.5 mm or more, and
    wherein the monofilament diameter is 0.5 to 3 mm, there is no spread of cavity with a rough diameter of 0.5 mm or more in the fiber axis direction of the oriented monofilament resulting from a cavity generated in unoriented monofilament, that the tensile strength at break is 600 MPa or more and the tensile elongation at break is 15 to 35%.

2. The polyvinylidenefluoride resin monofilament according to claim 1, wherein the component mass ratio of the polyvinylidenefluoride resin (a) and the copolymer of vinylidenefluoride and fluoroalkene (b) is 25/75 to 75/25, and
    an intrinsic viscosity of the monofilament after being dissolved into N-dimethylformamide at a concentration of 0.4 g/dl is 1.3 dl/g or more as measured at 30° C.

3. A fishing line for capturing large fishes comprised of the polyvinylidenefluoride resin monofilament according to claim 1.

4. The polyvinylidenefluoride resin monofilament according: to claim 1, wherein the fluoroalkene is hexafluoropropylene.

5. The polyvinylidenefluoride resin monofilament according to claim 1, wherein the cavity generated in the unoriented monofilament has a rough diameter of 0.5 mm or more and is generated in 1 or less per 10 m of the unoriented monofilament.

6. The polyvinylidenefluoride resin monofilament according to claim 1, wherein the crimp strength at break is 600 MPa or more, and the crimp elongation at break is 20 to 30%.

* * * * *